(12) United States Patent
Biehle

(10) Patent No.: US 11,846,272 B2
(45) Date of Patent: Dec. 19, 2023

(54) CABLE HOLDER FOR A CABLE OF A WIND TURBINE, AND METHOD

(71) Applicant: Wobben Properties GmbH, Aurich (DE)

(72) Inventor: Stefan Biehle, Großheide (DE)

(73) Assignee: Wobben Properties GmbH, Aurich (DE)

( * ) Notice: Subject to any disclaimer, the term of this patent is extended or adjusted under 35 U.S.C. 154(b) by 135 days.

(21) Appl. No.: 17/609,337

(22) PCT Filed: Apr. 8, 2020

(86) PCT No.: PCT/EP2020/060079
§ 371 (c)(1),
(2) Date: Nov. 5, 2021

(87) PCT Pub. No.: WO2020/224909
PCT Pub. Date: Nov. 12, 2020

(65) Prior Publication Data
US 2022/0163017 A1 May 26, 2022

(30) Foreign Application Priority Data
May 8, 2019 (DE) ..................... 10 2019 112 031.4

(51) Int. Cl.
*F03D 80/80* (2016.01)
*H02G 3/04* (2006.01)
*H02G 3/32* (2006.01)

(52) U.S. Cl.
CPC ........... *F03D 80/85* (2016.05); *H02G 3/0481* (2013.01); *H02G 3/32* (2013.01); *F05B 2240/85* (2020.08)

(58) Field of Classification Search
CPC .......... F03D 80/80; F03D 80/82; F03D 80/85; F05B 2240/85; H02G 3/00; H02G 3/02;
(Continued)

(56) References Cited

U.S. PATENT DOCUMENTS

| 1,576,947 A | 3/1926 | Cafiero |
| 2,913,791 A | 11/1959 | Martin |

(Continued)

FOREIGN PATENT DOCUMENTS

| CN | 108321747 A | 7/2018 |
| DE | 435678 C | 10/1926 |

(Continued)

*Primary Examiner* — Elton K Wong
(74) *Attorney, Agent, or Firm* — SEED INTELLECTUAL PROPERTY LAW GROUP LLP

(57) ABSTRACT

A cable holder, in particular for a cable of a wind turbine, to a cable harness, to a tower, to a wind turbine and also to a method for fastening a cable. In particular, a cable holder, in particular for a cable of a wind turbine, preferably for a medium-voltage cable connected to a medium-voltage transformer of a wind turbine, comprising a cable mount with a funnel-like cavity and also comprising an elastic insert, which is arranged within the funnel-like cavity, wherein the cable mount and the elastic insert are arranged and designed such that the cable can extend through the funnel-like cavity and the elastic insert can be clamped in between the cable mount and the cable.

18 Claims, 5 Drawing Sheets

(58) Field of Classification Search
CPC .. H02G 3/22; H02G 3/24; H02G 3/26; H02G 3/30; H02G 3/32; Y02E 10/72
See application file for complete search history.

(56) References Cited

U.S. PATENT DOCUMENTS

| | | | |
|---|---|---|---|
| 8,866,330 B2 | 10/2014 | Domesle et al. | |
| 9,677,275 B2 | 6/2017 | Stracke | |
| 2002/0012582 A1* | 1/2002 | Kirkegaard | H02G 7/00 415/4.3 |
| 2015/0362096 A1* | 12/2015 | Durney | H02G 3/32 24/122.3 |
| 2022/0195996 A1* | 6/2022 | Blaabjerg | F03D 13/10 |

FOREIGN PATENT DOCUMENTS

| | | |
|---|---|---|
| DE | 10 2012 001 409 A1 | 7/2013 |
| GB | 2527084 A | 12/2015 |
| JP | H0670428 A | 3/1994 |
| WO | 2011/151466 A2 | 12/2011 |
| WO | 2014/095330 A1 | 6/2014 |

\* cited by examiner

CABLE HOLDER FOR A CABLE OF A WIND TURBINE, AND METHOD

BACKGROUND

Technical Field

The invention relates to a cable holder, in particular for a cable of a wind turbine, to a cable harness, to a tower, to a wind turbine, as well as to a method for fastening a cable.

Description of the Related Art

Wind turbines are known in principle; said wind turbines generate electric power from wind. Modern wind turbines typically relate to so-called horizontal-axis wind turbines in which the rotor axis is disposed so as to be substantially horizontal and the rotor blades sweep a substantially perpendicular rotor area. Apart from a rotor disposed on a nacelle, wind turbines comprise a tower on which the nacelle with the rotor is disposed so as to be rotatable about an axis that is aligned so as to be substantially vertical.

The towers for wind turbines are typically slender buildings which preferably have a great height and orthogonally to this height have comparatively minor dimensions. Towers are preferably composed substantially of concrete and/or steel, or comprise these materials. The range of tower embodiments spans the bandwidth starting with lattice constructions or tubular steel towers with or without guy cables, and ending with concrete buildings.

Various installations can be disposed within the towers of wind turbines. The cables usually extend from the nacelle, and thus from a tower top, down to a tower base. The cables can be configured as low-voltage cables or as medium-voltage cables, for example. The cables within a tower of a wind turbine are usually disposed and fixed using plastic clips, cable stockings or metal brackets. A plurality of these fastening elements typically have to be disposed on top of one another in order to be able to support the high cable weights, in particular when disposing heavy cables, for example such which exceed a linear unit weight of 9 kg/m. In the case of high cable weights in conjunction with comparatively large fastening spacings, plastic clips, cable stockings or metal brackets can lead to damage to the cables Apart from the direct costs for these fastening elements, the disposal of such a high number of fastening elements on the tower is complex and requires a high input of labor which may be associated with significant costs. Moreover, servicing or checking, respectively, these fastening elements may be required at regular intervals.

Alternatively or additionally, the cable weights can also be supported by pedestals which are disposed in the tower. For example, that is the possibility of guiding the cable in an S-shaped manner about a device disposed on a pedestal. This S-shaped guide can at least partially support the weight of the cable such that the latter is directed into the pedestal and from the latter into the tower. However, the devices with this S-shaped guide have a large requirement in terms of space because the cables usually have large minimum bending radii. The pedestals typically have to be configured specially for this purpose. Moreover, guiding the cable in an S-shaped manner is associated with high complexity in terms of the installation.

In order to be able to guarantee a flawless operation of a wind turbine, current-conducting cables which are free of damage are required within the tower of a wind turbine. Moreover, the costs for constructing a wind turbine are a decisive factor with a view to the economic viability. Given hub heights which in the meantime have reached more than 150 meters, the economic aspects of fastening the cable within the tower of a wind turbine must also be taken into account.

The German patent and trademark office in the context of the priority application pertaining to the present application has searched the following prior art: DE 435 678 A, U.S. Pat. No. 1,576,947 A, WO 2014/095 330 A1, CN 108 321 747 A, JP H06-70 428 A.

BRIEF SUMMARY

Provided is a cable holder, in particular for a cable of a wind turbine, a cable harness, a tower, a wind turbine as well as a method for fastening a cable, which may minimize or eliminate one or a plurality of the mentioned disadvantages. Provided are techniques which enables cables to be fastened more economically and/order in a technically improved manner within a wind turbine tower.

According to a first aspect, provided is a cable holder, in particular for a cable of a wind turbine, preferably for a medium-voltage cable connected to a medium-voltage transformer of a wind turbine, comprising a cable receptacle having a funnel-shaped cavity; and an elastic insert disposed within the funnel-shaped cavity; wherein the cable receptacle and the elastic insert are disposed and configured in such a manner that the cable can extend through the funnel-shaped cavity, and the elastic insert is able to be jammed between the cable receptacle and the cable.

The cable receptacle has a funnel-shaped cavity. The funnel-shaped cavity of the cable receptacle preferably extends from a first, upper opening of the cable receptacle to a second, lower opening of the cable receptacle, wherein the upper and the lower opening preferably are end-side openings of the cable receptacle. A cable passage axis preferably runs between the upper and the lower opening. In the operation of the cable holder, a cable extends through the cable receptacle, in particular through the funnel-shaped cavity. In the operation, a longitudinal axis of the cable is substantially parallel to, in particular coaxial with, the cable passage axis. The cable receptacle extends in the radial direction, so as to be orthogonal to the extent between the upper opening and the lower opening. The cable receptacle here extends in particular between internal walls.

The funnel-shaped geometry of the cavity means in particular that the cavity is tapered. The funnel-shaped cavity can have a tapered portion, and optionally also a portion which adjoins the former and opens out again. It is particularly significant that the funnel-shaped cavity has at least one tapered portion which in the context of this description is understood to be funnel-shaped such that a clamping effect between the cable receptacle, the elastic insert and the cable can be created. The funnel-shaped cavity can have straight, convex and/or concave profiles.

The cable receptacle between the upper opening and the lower opening preferably has the cable passage axis. The cable receptacle, in a manner orthogonal to the cable passage axis, preferably has a cross section. This cross section can be configured so as to be annular and/or angular, in particular polygonal. The cable receptacle can be configured so as to be rotationally symmetrical about the cable passage axis, for example.

The cable receptacle can be composed of aluminum or steel, in particular stainless steel, for example, or comprise aluminum or steel, in particular stainless steel. The wall thickness of the cable receptacle, thus in particular the thickness in the radial direction, is preferably between 1 mm (millimeters) and 10 mm, in particular between 2 mm and 5 mm. The funnel-shaped cavity can have radial internal dimensions, for example diameters, between 50 mm and 140 mm. The radial external dimensions can be, for example, between 150 mm and 250 mm. Moreover, the cable receptacle between the upper opening and the lower opening can extend at a height between 200 mm and 1000 mm.

The elastic insert is disposed within the funnel-shaped cavity. The elastic insert is in particular disposed and configured in such a manner that said elastic insert in the operation is jammed between a cable and an internal wall of the cable receptacle. A relative movement between the cable and the cable receptacle is prevented or blocked, respectively, as a result of this jamming.

It is particularly preferable for the cable receptacle and the elastic insert to be disposed and/or configured in such a manner that a cable is able to extend through the funnel-shaped cavity, and the elastic insert is able to be jammed between the cable receptacle and the cable, such that a movement of the cable is blocked in at least one direction, in particular in the direction of the taper of the cavity.

The elastic insert can also be configured in such a manner that two or more cables can extend through said elastic insert. For example, the elastic insert can also be at least partially disposed between the two or more cables. The elastic insert preferably comprises a cylindrical and/or conical main body in which two or more through openings are disposed, wherein the two or more through openings are preferably aligned so as to be substantially parallel to the cable passage axis of the cable receptacle. One cable can in each case be able to be disposed in one through opening. It can moreover also be preferable for two or more cables to be able to be disposed in one through opening. A passage can in each case be disposed between one through opening and an external circumferential face of the elastic insert, thus enabling a cable to be introduced circumferentially.

It is particularly preferable for a movement in a direction from the upper end to the lower end to be blocked, whereby the upper end is distinguished by dimensions, in particular by a diameter or a radial extent of a polygonal cross section, which are larger than dimensions, in particular a diameter or a radial extent of a polygonal cross section, of the lower opening.

The assembly of the cable holder during operation preferably takes place in such a manner that said cable holder is disposed on a tower, in particular an internal wall of a tower. The cable is subsequently disposed in the funnel-shaped cavity. The elastic insert is subsequently inserted into the funnel-shaped cavity, in particular in such a manner that said elastic insert is situated in an intermediate space between an internal wall of the cable receptacle and the cable. For example, the elastic insert can be disposed about the cable. Thereafter, a lifting means of the cable is de-stressed such that the cable is moved downward as a result of gravity. As a result of this downward movement, the cable pulls the elastic insert further in the direction of the smaller, lower opening of the cable receptacle, and is jammed between the internal wall of the cable receptacle and the cable. The cable is jammed as a result of the friction force between the cable and the elastic insert and is thus blocked in terms of the downward vertical movement thereof.

The disclosure is based inter alia on the concept that the cables of wind turbines represent a sensitive apparatus. Moreover, the disclosure is based on the concept that medium-voltage cables which have a higher linear unit weight than previously used low-voltage cables are increasingly used in the towers. The fastenings for cables within towers of wind turbines known to date can thus increasingly not be used for the modern cables of this weight without being able to preclude damage and/or ensuring the economic viability of the fastening.

The cable holder is particularly suitable for a cable of a wind turbine that has a weight of more than 6 kg/m, preferably more than 8 kg/m, in particular more than 9 kg/m. A 30 m portion of a cable with a linear unit weight of 9 kg has a weight of 270 kg. Weights of this type can typically not be absorbed by the cable stockings, collars or metal brackets usually used. The cable holder according to the aspect mentioned above is suitable for absorbing high linear unit weights of cables, despite the large mutual spacing of the cable holders. Consequently, fewer cable holders are to be provided overall in a tower of a wind turbine. The complexity in terms of the assembly is reduced by virtue of this lower number of cable holders. Moreover, the inventor of the cable holder described above has discovered that the jamming enables particularly advantageous fastening of the cable and at the same time the absence of damage.

According to a preferred variant of embodiment of the cable holder it is provided that the cable receptacle for introducing a portion of the cable into the funnel-shaped cavity, in particular for introducing the latter circumferentially, is configured so as to be open on the circumference.

The cable receptacle preferably extends from a first end side to a second end side, wherein these end sides can comprise the openings through which the cable extends. The cable receptacle between the end sides preferably extends circumferentially. Said cable receptacle in this preferred variant of embodiment is configured so as to be partially open on the circumference and is thus in particular configured so as to be fractioned. The open configuration of the cable receptacle enables a portion of the cable to be introduced into the funnel-shaped cavity.

The introduction of the portion of the cable can in particular take place by way of an introduction direction which is aligned so as to be substantially orthogonal to the longitudinal direction of the cable. The cable receptacle is preferably configured so as to be open between the end sides mentioned above. As a result of this open configuration of the cable receptacle, the cable receptacle can first be fastened to a tower, and the cable can subsequently be disposed in the funnel-shaped cavity. The fastening of the cable in the cable holder is simplified as a result.

A further preferred refinement of the cable holder provides that the cable receptacle has an upper portion and a lower portion, an upper dimension of the funnel-shaped cavity in the upper portion being larger than a lower dimension of the funnel-shaped cavity in the lower portion, and the funnel-shaped cavity in the upper portion and/or in the lower portion preferably having an annular cross section.

In the case of an annular cross section of the cable receptacle in the upper portion, the upper dimension of the funnel-shaped cavity in the upper portion is preferably to be understood to be a diameter. In the case of an annular cross section of the lower portion, the lower dimension of the funnel-shaped cavity in the lower portion is likewise preferably to be understood to be a diameter. The clamping effect described above is enabled as a result of the different dimensions of the funnel-shaped cavity. The cross section mentioned above is in particular to be understood as being orthogonal to the cable passage axis.

The annular cross section is preferably distinguished by an external diameter and an internal diameter. The annular cross section can also have oval portions. As a result of the funnel-shaped cavity is can be provided that the internal diameter continually decreases from the upper end to the lower end. Alternatively, the internal diameter may also be constant in portions. It is in particular preferable for the internal diameter to decrease, in particular continually decrease, in the lower portion that is adjacent to the lower end.

According to a further preferred refinement of the cable holder it is provided that the cable receptacle in the longitudinal direction extends from the upper end to the lower end, the upper portion is adjacent to the upper end, and the lower portion is adjacent to the lower end, and the cable receptacle has an introduction opening which extends from the upper end to the lower end and is configured so that a cable is able to be introduced into the funnel-shaped cavity through this introduction opening.

The longitudinal direction is preferably aligned so as to be parallel to the cable passage axis. The longitudinal direction runs in particular between the end sides. The cable receptacle in a circumferential direction extends so as to be orthogonal to the cable passage axis, or the longitudinal direction, respectively, and orthogonal to the radial direction. The extent in the circumferential direction can be configured by a wall of the cable receptacle, for example.

The introduction opening preferably likewise extends in the circumferential direction. The opening angle of the introduction opening can be larger than 30°, larger than 45°, larger than 60° or larger than 90°, for example. The introduction opening can be configured so as to taper from the upper end to the lower end. The introduction opening is in particular to be understood to be an opening in addition to the end-side openings.

The cable receptacle preferably has three openings, specifically the introduction opening, an opening at the upper end and an opening at the lower end. The openings at the upper end and at the lower end serve for the cable to extend therethrough. The cable thus also extends through these openings during operation. The introduction opening is provided only for introducing the cable into the funnel-shaped cavity. The introduction opening is thus preferably used only when assembling or disassembling the cable in the cable holder or from the cable holder, respectively. The openings can be connected to one another; the openings at the upper end and at the lower end can in particular be connected to the introduction opening.

In a preferred variant of embodiment of the cable holder it is provided that the latter comprises a funnel closure for closing the introduction opening, wherein the funnel closure preferably has substantially the geometry of the introduction opening.

For example, the funnel closure can be disposed on the holding element, yet to be explained in more detail hereunder, wherein the funnel closure, upon rotating the cable receptacle in such a manner that the introduction opening faces the nearest tower wall, is preferably configured so that the introduction opening is closed. Moreover, the funnel closure can also be configured as a screw or a hook, or comprise said screw or said hook, wherein it is particularly preferable for the screw or the hook to be able to be disposed in a corresponding opening of the holding element.

Once a cable has been introduced into the funnel-shaped cavity through the introduction opening, the introduction opening can be closed by the funnel closure. The cable holder, upon closing the introduction opening, is preferably rotated conjointly with the funnel closure.

According to a further preferred refinement of the cable holder it is provided that the cable receptacle is configured as a first shell segment which has a first circumferential extent which, while running less than 360° in the circumferential direction, configures the introduction opening; and the funnel closure is configured as a second shell segment which has a second circumferential extent which runs in the circumferential direction, the first circumferential extent and the second circumferential extent conjointly resulting in substantially 360°.

The circumferential direction is aligned so as to be orthogonal to the cable passage axis, or to the longitudinal extent of the cable receptacle, respectively. In operation, the circumferential direction is additionally also substantially orthogonal to a cable longitudinal extent of the cable that extends through the funnel-shaped cavity. The first shell segment in this variant of embodiment configures the cable receptacle. The first shell segment in the circumferential direction extends by less than 360°. The introduction opening is configured as a result thereof. For example, when the first shell segment extends by a first circumferential extent of 330°, the introduction opening has a circumferential extent of 30°. The cable holder for closing the introduction opening has the funnel closure which is configured as a second shell segment.

In the previous example, the funnel closure would have a second circumferential extent of 30°, for example. Depending on the principle of the closure, the sum formed by the first circumferential direction and the second circumferential direction can also result in more or less than 360°. Substantially 360° can mean in particular that the sum formed from the first circumferential direction and the second circumferential direction is between 358° and 362°.

In a further preferred refinement of the cable holder it is provided that the cable receptacle and/or the elastic insert each have an annular cross section, and an external circumferential face of the elastic insert is disposed on an internal circumferential face of the cable receptacle.

In this refinement of the cable holder the elastic insert is disposed on an internal circumferential face of the cable receptacle. When a cable is guided through the cable receptacle, the elastic insert is disposed between the internal circumferential face of the cable receptacle and the cable. As a result thereof, jamming can arise between the internal circumferential face of the cable receptacle and the cable because the elastic insert is disposed therebetween. Fastening of the cable in the direction of the cable passage axis of the cable receptacle is implemented in a surprisingly simple manner in this way.

A further preferred refinement of the cable holder provides that the elastic insert has a tubular and/or a funnel-shaped geometry, and/or the elastic insert is a rubber insert. It is particularly preferable for the elastic insert to have a geometry that corresponds to that of the cable receptacle.

The elastic insert can be composed of rubber, for example, or comprise rubber. It is particularly preferable for the elastic insert to be composed of ethylene propylene diene monomer rubber or to comprise the latter. Moreover, the elastic insert can comprise one or a plurality of the following materials or be composed of the latter: polyurethane; cellular rubber; elastomers, in particular styrene butadiene rubber, acrylonitrile butadiene rubber, polychloroprene, butyl rubber/isobutene-isoprene rubber, polyolefin rubber/ethylene-propylene rubber.

In a further preferred refinement of the cable holder it is provided that the elastic insert has a slot and the cable holder preferably has the cable passage axis, wherein the direction of main extent of the slot is aligned so as to be substantially parallel to the cable passage axis.

That component of the direction of main extent of the slot that in the operation is vertical is in particular substantially parallel to the cable passage axis. As a result of the funnel-shaped geometry of the cable receptacle and of the elastic insert disposed therein, the slot typically also has a minor horizontal directional component. The elastic insert can likewise be configured as a shell segment, in particular as a slotted shell segment. The shell segment is preferably configured so as to be tubular and/or funnel-shaped. It is particularly preferable for the elastic insert to have an extent in a circumferential direction. It is preferable for this extent in the circumferential direction to be 360°, less than 360°, or less than 330°.

It is moreover preferable for the cable holder to have a holding element for disposal on a tower, the cable receptacle being coupled to the holding element. The holding element is in particular configured in such a manner that said holding element for fastening is able to be disposed on a tower wall and/or on a flange, in particular a horizontal flange and/or a vertical flange, of a tower wall segment and/or on a pedestal within a tower. The holding element is preferably able to be disposed on a tower in such a manner that said holding element in operation is able to be fixed in the vertical direction. A downward vertical movement is in particular blocked. The holding element can be screwed or adhesively bonded to the tower.

It is moreover preferable for the holding element to have an introduction groove having an introduction width that is transverse to an introduction direction, and for the introduction width to be smaller than a diameter of the cable receptacle at the upper end such that a form-fitting connection in a vertical direction is configured between the holding element and the cable receptacle.

The introduction direction is preferably the direction in which the cable is introduced into the holding element through the introduction opening. The cable receptacle at the upper end can have a collar. This collar can be provided for coupling in a form-fitting manner to the holding element. As a result of the collar, a suspended disposal of the cable receptacle on the holding element can be configured.

It can moreover be preferable for the cable receptacle to be rotatably disposed on the holding element. As a result of the rotatability of the cable receptacle on the holding element, the introduction opening for disposing the cable in the funnel-shaped cavity can face the interior of the tower. Once a cable has been disposed in the funnel-shaped cavity and the elastic insert has been disposed in the latter, the cable receptacle can be rotated in such a manner that the introduction opening faces away from the interior of the tower and faces a tower wall, for example. It is particularly preferable for the funnel closure to close the opening. A secure disposal of the cable by way of the cable holder is thus possible, and the cable is at least partially shielded and protected by the interior of the tower.

According to a further aspect, provided is a cable harness for a wind turbine, comprising a cable, in particular a low-voltage cable and/or a medium-voltage cable, having a cable diameter, a cable holder according to at least one of the variants of embodiment described above, wherein the cable extends through the cable holder, and a lower diameter of the cable receptacle relative to the cable diameter is dimensioned in such a manner that the elastic insert is jammed between the cable receptacle and the cable such that a movement of the cable directed from the upper end to the lower end of the cable receptacle is substantially prevented.

The cable extends in particular from a first end side to a second end side of the cable holder, in particular of the cable receptacle. An upper diameter of the cable receptacle is preferably larger than the lower diameter of the cable receptacle. The lower diameter of the cable receptacle is preferably slightly larger than the cable diameter. The cable, in a vertical movement in the direction of the lower end, entrains the elastic insert in the direction of the lower end. As a result, the available space for the cable and for the elastic insert is decreased such that the elastic insert is squeezed in particular in the radial direction.

As a result of the elastic insert being squeezed like this, the friction forces between the cable, the elastic insert and the cable receptacle increase. Once a critical friction force is reached, the dynamic friction transitions to static friction. The vertical movement of the cable is prevented once the static friction is reached. When this movement is prevented, the cable is substantially blocked and thus fixed in the vertical downward direction.

A preferred refinement of the cable harness provides that a first coefficient of friction between the cable receptacle and the elastic insert is lower than a second coefficient of friction between the elastic insert and the cable. The elastic insert preferably comprises a first surface that faces the cable receptacle, and a second surface that faces the cable, wherein the first surface has a lower surface roughness than the second surface.

By providing friction coefficients of this type the function described above is advantageously enabled. By providing a second coefficient of friction which is higher than a first coefficient of friction it is in particular ensured that the cable entrains the elastic insert to the lower end of the cable receptacle, squeezing of the elastic insert thus arising there, or in a region adjacent to the lower end, respectively.

According to a further preferred refinement of the cable harness it is provided that the cable has a cable weight of more than 6 kg/m, in particular more than 8 kg/m, preferably more than 9 kg/m. For example, a cable of 9 kg/m has a weight of 270 kg/30 m. It is moreover preferable for the cable to have a length of more than 30 m, more than 60 m, more than 90 m, more than 120 m, or more than 150 m. Moreover, it can be preferable for the cable harness to have two or more cable holders according to one of the variants of embodiment described above.

According to a further aspect, provided is a tower of a wind turbine, comprising a cable holder according to at least one of the variants of embodiment described above, and/or a cable harness according to one of the variants of embodiments described above.

A preferred refinement of the tower provides that the latter comprises two or more cable holders according to at least one of the variants of embodiment described above, and wherein the two or more cable holders are mutually spaced apart by more than 10 meters, more than 15 meters, or more than 20 meters, preferably more than 30 meters. Furthermore, the tower can comprise a cable harness according to the preceding aspect, having two or more cable holders according to at least one of the variants of embodiments described above, wherein the two or more cable holders are mutually spaced apart by more than 10 meters, more than 15 meters, or more than 20 meters, preferably more than 30 meters.

According to a further aspect, provided is a wind turbine comprising a tower according to at least one of the variants of embodiment described above.

According to a further aspect, provided is a method for fastening a cable, in particular within a tower of a wind turbine, said method comprising the following steps: introducing a cable into a cable receptacle having a funnel-shaped cavity; and disposing an elastic insert in an intermediate space between the cable receptacle and the cable such that the elastic insert bears at least in portions on the cable and the cable receptacle.

According to a preferred refinement of the method it is provided that said method comprises the following step or steps: closing an introduction opening of the cable receptacle with a funnel closure; and/or rotating the cable receptacle in such a manner that the introduction opening faces a tower wall; and/or de-stressing the cable in the vertical direction such that at least part of the weight of the cable is held by a friction force acting between the cable and the elastic insert.

The method and the potential refinements thereof have features or method steps, respectively, which render the method and the potential refinements thereof particularly suitable for use with a cable holder, a cable harness, a tower and a wind turbine, as described above, and the potential refinements of the aforementioned. In terms of further advantages, variants of embodiment and details of embodiments of the further aspects and the potential refinements thereof, reference is also made to the description above pertaining to the corresponding features and refinements of the cable holder.

BRIEF DESCRIPTION OF THE SEVERAL VIEWS OF THE DRAWINGS

Preferred exemplary embodiments of the invention will be explained in an exemplary manner by means of the appended figures in which.

Identical elements or elements which are substantially identical or similar in terms of function are provided with the same reference signs in the figures.

DETAILED DESCRIPTION

Figure 1:
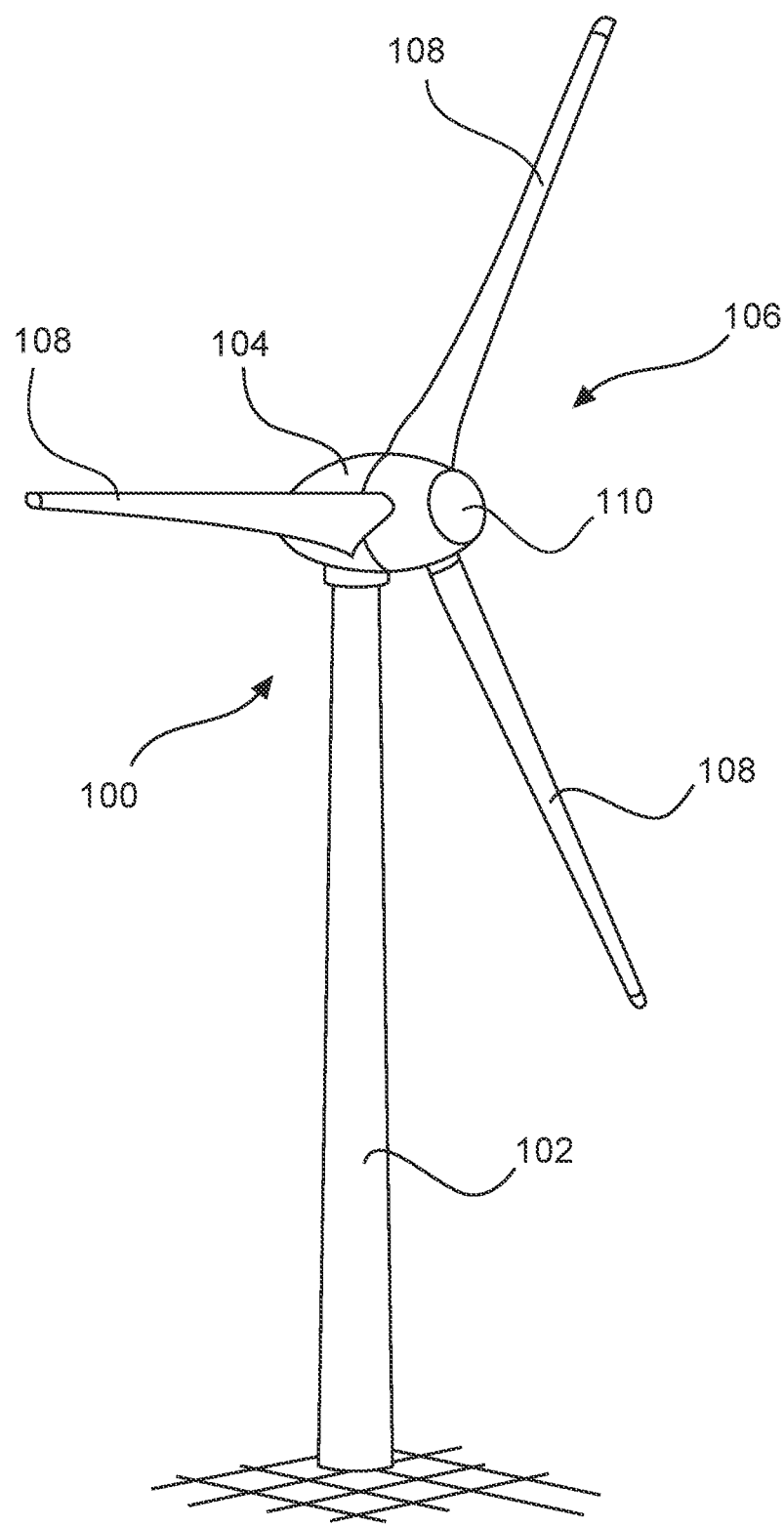
FIG. 1 shows a schematic, three-dimensional view of an exemplary embodiment of a wind turbine.

FIG. 1 shows a schematic, three-dimensional view of an exemplary embodiment of a wind turbine. The wind turbine 100 has a tower 102 and a nacelle 104 on the tower 102. An aerodynamic rotor 106 having rotor blades 108 and a spinner 110 is provided on the nacelle 104. The aerodynamic rotor 106 in the operation of the wind turbine 100 is set in rotation by the wind and thus also rotates an electrodynamic rotor of a generator that is coupled directly or indirectly to the aerodynamic rotor 106. The electric generator is disposed in the nacelle 104 and generates electric power. The pitch angles of the primary rotor blades 108 can be varied by pitch motors on the rotor blade roots of the respective primary rotor blades 108.

The electrodynamic rotor of the generator is usually situated in the nacelle 104. The electric power generated in the nacelle 104 is fed into a supply network. To this end, the electric power first has to be directed from the nacelle 104 in the direction of the tower base. Cables within the tower 102 are typically provided to this end. A cable holder which comprises a cable receptacle having a funnel-shaped cavity and an elastic insert disposed within the funnel-shaped cavity is in particular provided in the tower 102. The funnel-shaped cavity tapers in the vertical downward direction. The cable receptacle and the elastic insert are disposed and configured in such a manner that a cable extends through the funnel-shaped cavity, and the elastic insert is jammed between the cable receptacle and the cable. As a result, the cable is fixed in a downward-directed vertical direction.

Figure 2:
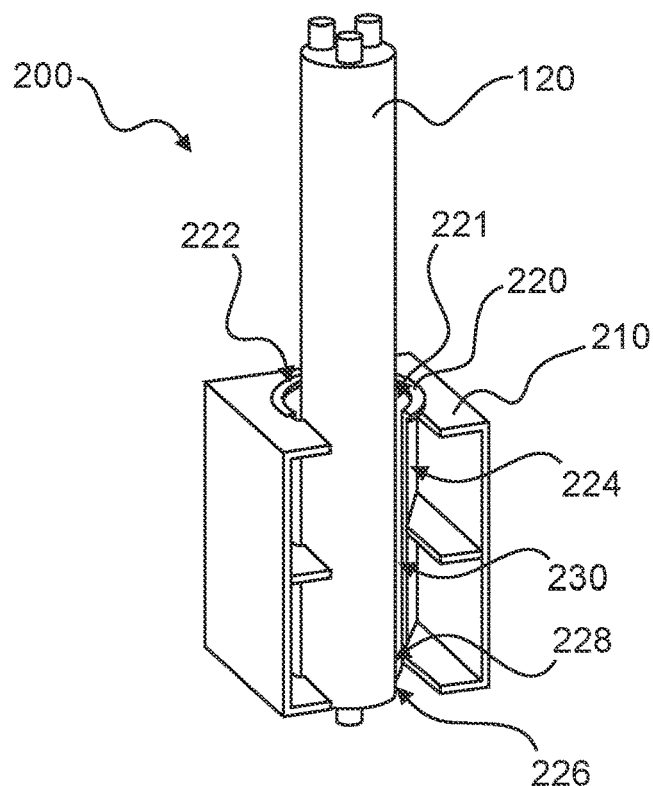
FIGS. 2 to 4 show schematic, three-dimensional views of an exemplary embodiment of a cable holder.
Figure 2:
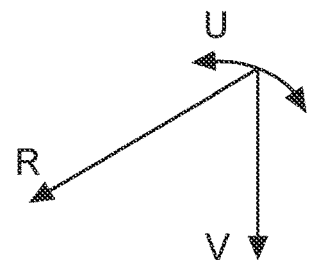
Figure 3:
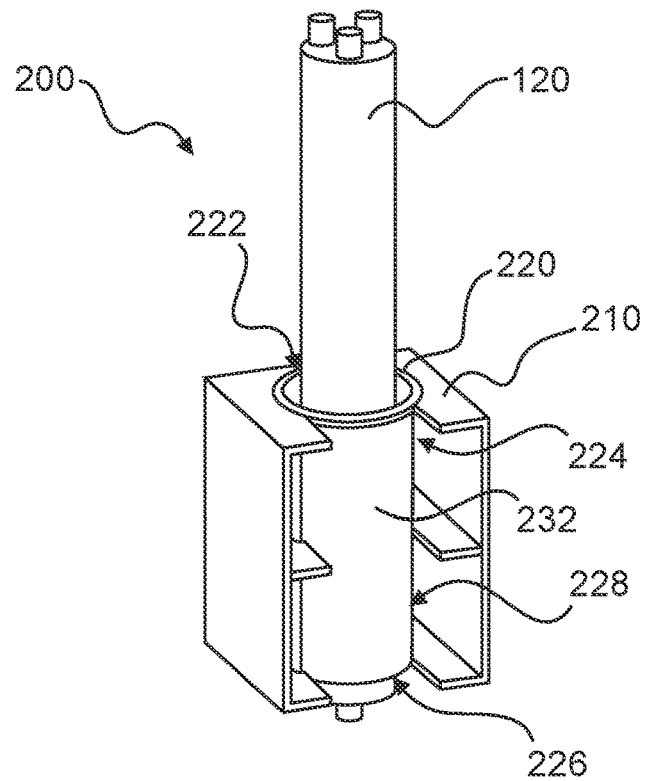
Figure 3:
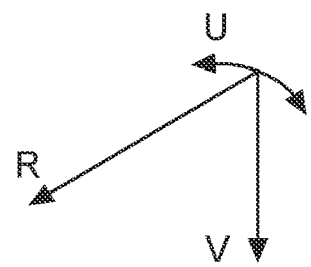
Figure 4:
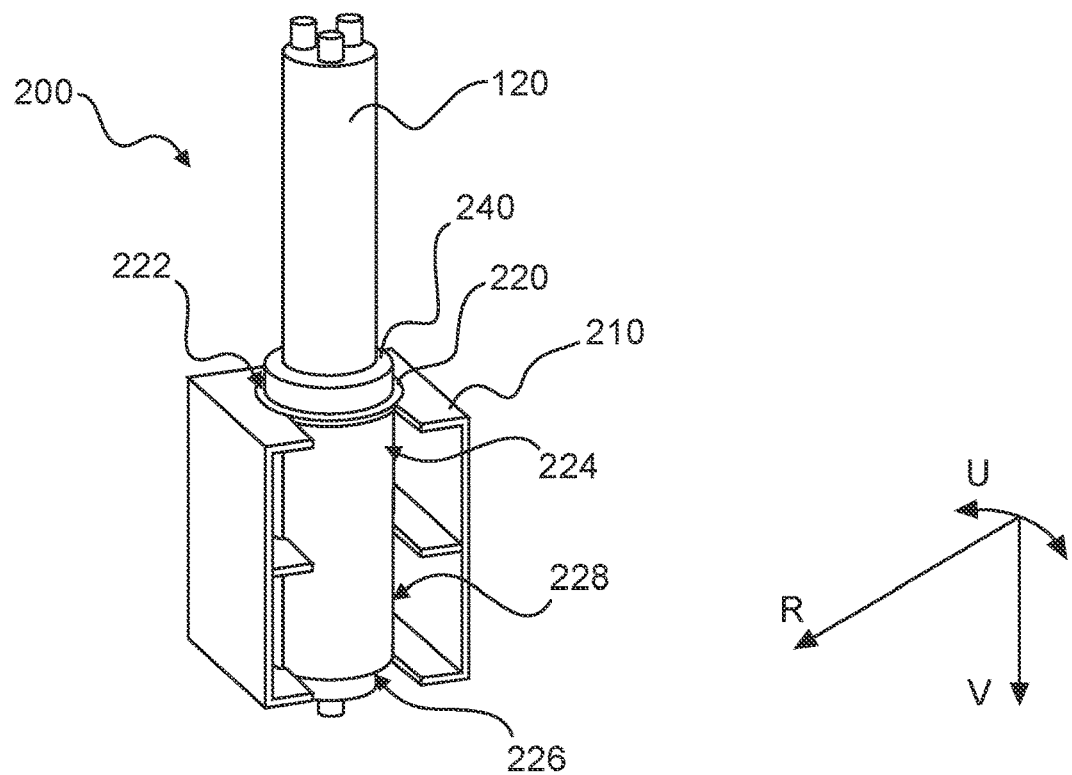

FIGS. 2 to 4 show schematic, three-dimensional views of an exemplary embodiment of a cable holder 200. The cable holder 200 comprises the cable receptacle 220, a cable 120 extending through the funnel-shaped cavity 221 of said cable receptacle 220. The cable receptacle 220 extends from an upper end 222 to a lower end 226, the upper end 222 and the lower end 226 can also be understood to be ends at the end sides of the cable receptacle 220. The cable receptacle 220 has an upper portion 224 that is adjacent to the upper end 222. The cable receptacle 220 has a lower portion 228 that is adjacent to the lower end 226. The diameter of the cable holder 200 in the upper portion 224 is larger than in the lower portion 228. The funnel-shaped design of the cavity 221 is configured as a result thereof.

The cable receptacle 220 at the upper end 222 has a collar which protrudes radially outward. This collar causes a form-fit with the holding element 210. The holding element 210 has an introduction groove having an introduction width that is transverse to the introduction direction. The introduction width is smaller than a diameter of the collar at the upper end 222 such that a form-fitting connection in the vertical direction V is configured between the holding element 210 and the cable receptacle 220. The cable receptacle 220 in the radial direction R extends so as to be orthogonal to this vertical direction V. The cable receptacle 220 in the plane of the radial direction R has an annular cross section.

The cable receptacle in the circumferential direction U extends at a first circumferential extent of approx. 270°. Configured as a result is an introduction opening 230 which in the circumferential direction U extends at 90°. As is shown in FIG. 3, the introduction opening 230 is closed by a funnel closure 232. The cable receptacle 220 and the funnel closure 232 configure a closed funnel-shaped geometry. The cable receptacle 220, upon disposal of the funnel closure 232, can be rotated in the circumferential direction U about the axis V such that the funnel closure 232 faces a tower wall.

The elastic insert 240 can subsequently be disposed in the intermediate space configured between the cable 120 and the internal wall of the cable receptacle 220 and of the funnel closure 232. A second coefficient of friction preferably acts between the cable 120 and the elastic insert 240. Furthermore preferably, a first coefficient of friction acts between the cable receptacle 220 and/or the funnel closure 232 and the elastic insert 240, wherein the first coefficient of friction is lower than a second coefficient of friction. In a movement of the cable 120 in the vertical direction V, the elastic insert 240 is consequently moved conjointly with the cable 120 in the direction V.

As a result of the funnel-shaped geometry of the cable receptacle 220, the elastic insert 240 is in particular squeezed between the cable receptacle 220 and the cable 120 in the lower portion 228. When the elastic insert 240 is correspondingly sized in the radial direction R, squeezing in such an intense manner takes place that the friction between the cable 120 and the elastic insert 240 transitions to a static friction. A movement of the cable 120 in the vertical direction V is blocked on the transition to a static friction.

Figure 5:
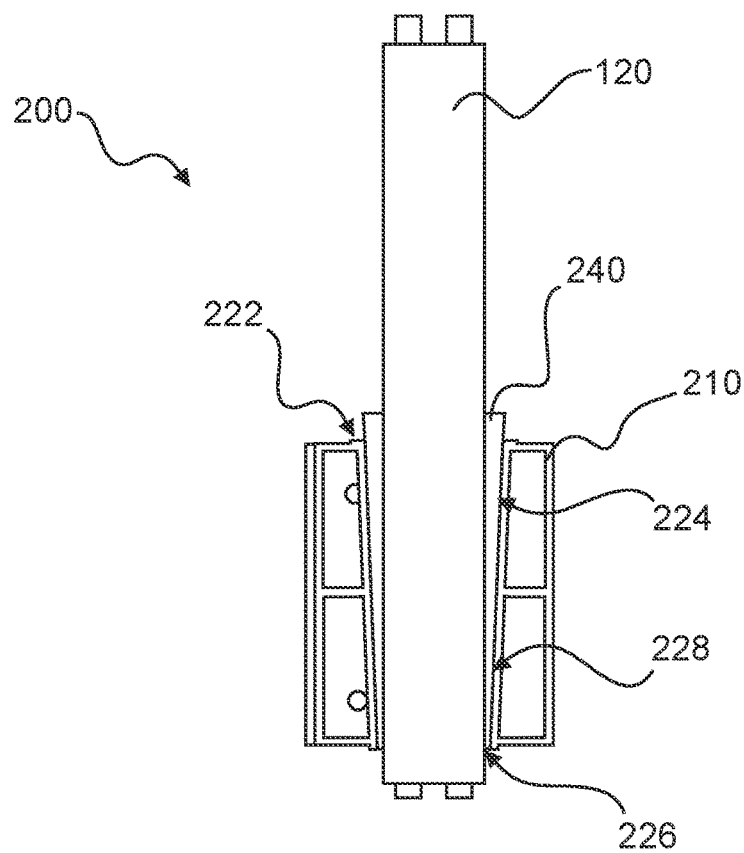
FIG. 5 shows a schematic, two-dimensional sectional view of the cable holder shown in FIGS. 2 to 4.
Figure 6:
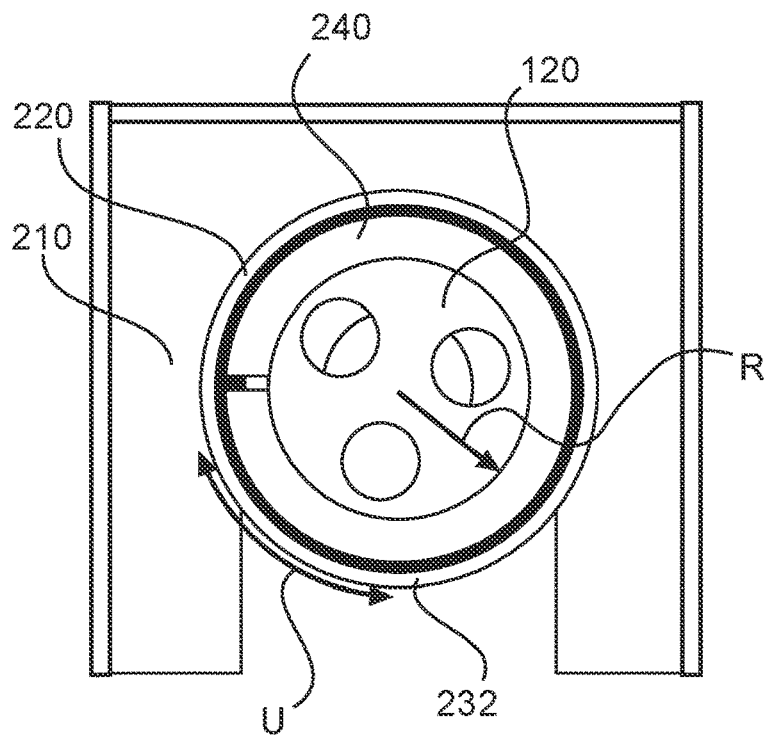
FIG. 6 shows a schematic, two-dimensional sectional plan view of the cable holder shown in FIGS. 2 to 4.

This squeezing of the elastic insert 240 between the cable receptacle 220 and the cable 120 is in particular shown in FIG. 5. It can be seen here that more intense squeezing of the elastic insert 240 takes place on the lower portion 228 than in the upper portion 224. The sectional view through the cable receptacle 220 can be derived from FIG. 6. It can be seen that the cable receptacle 220 having the funnel-shaped cavity 221 is present on the outside. Adjacent thereto is the elastic insert 240, wherein the cable 120 is disposed within the elastic insert 240. The cable receptacle 220 within an introduction groove of the holding element 210 is fixed in a form-fitting manner in the vertical direction V by means of a collar.

Figure 7:
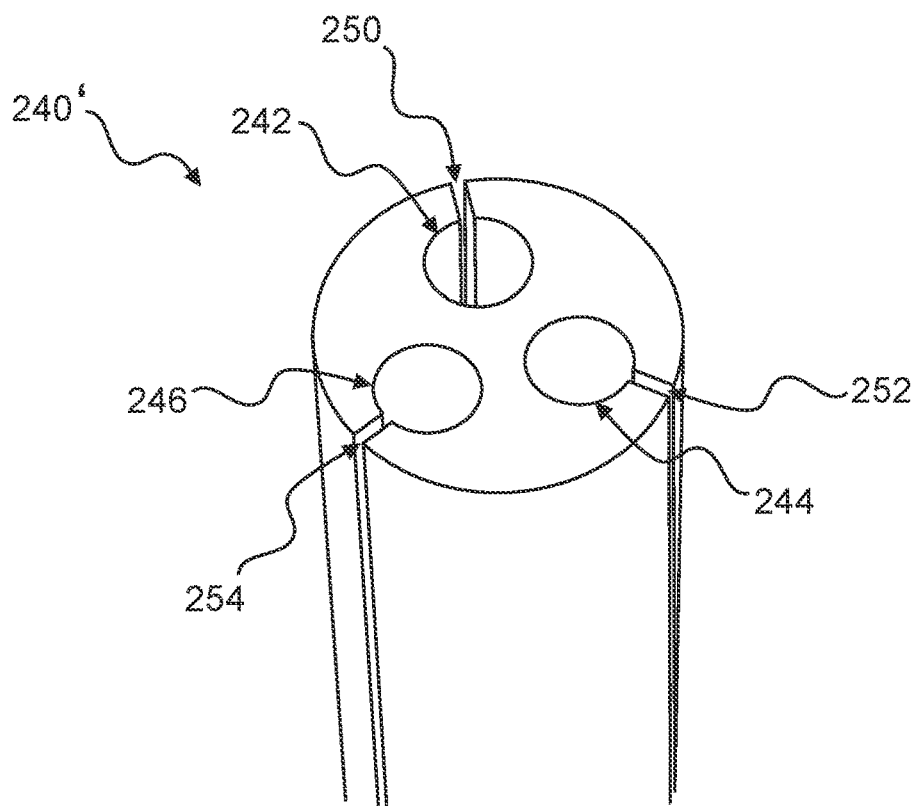
FIG. 7 shows a schematic, three-dimensional view of an exemplary embodiment of an elastic insert.

FIG. 7 shows a schematic, three-dimensional view of an exemplary embodiment of an elastic insert 240'. FIG. 7 shows in particular an end side and part of the circumferential side of the substantially cylindrical elastic insert 240'. The elastic insert 240' is provided for the event that three cables are to be fastened by one cable holder 200. To this end, the elastic insert 240' has a first through opening 242, a second through opening 244 and a third through opening 246. One cable can be disposed in each of the through openings 242, 244, 246. As a result of the funnel-shaped cavity 221 of the cable receptacle 220, this elastic insert 240' is also squeezed between the cables and the cable receptacle 220 such that fastening of the cables takes place. In order for the cables to be disposed in the through openings 242, 244, 246, the latter each have one passage 250, 252, 254 which connect the through openings 242, 244, 246 to the external circumferential face of the elastic insert 240'.

Figure 8:
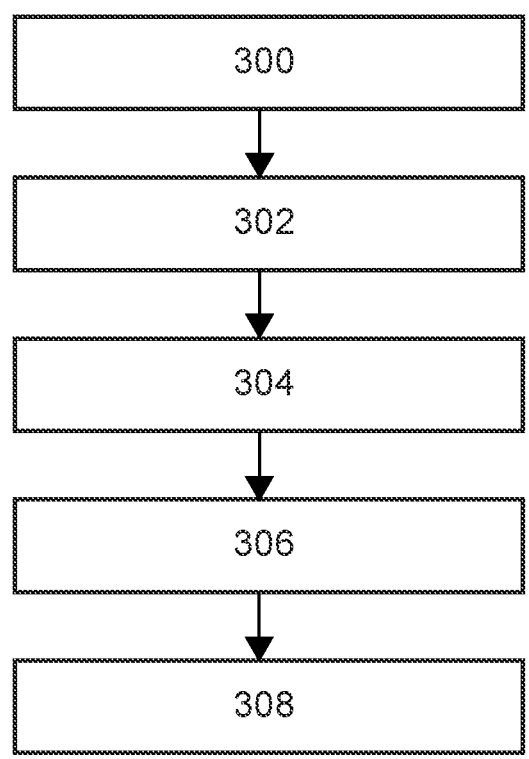
FIG. 8 shows a schematic illustration of an exemplary embodiment of a method for fastening a cable in a wind turbine tower.

FIG. 8 shows a schematic illustration of an exemplary embodiment of a method for fastening a cable in a wind turbine tower. In step 300, the cable 120, or two or more cables, is/are introduced into the cable receptacle 220 having the funnel-shaped cavity 221. In step 302, the elastic insert 240, 240' is disposed in the intermediate space between the cable receptacle 220 and the cable 120 such that the elastic insert 240, 240' at least in portions bears on the cable 120, or the cables, respectively, and the cable receptacle 220.

In step 304, the introduction opening 230 of the cable receptacle 220 is closed by a funnel closure 232. In step 306, the cable receptacle 220 is rotated in the circumferential direction U so that the introduction opening 230 faces a tower wall. In step 308, the cable 120 is des-stressed in the vertical direction V such that at least part of the weight of the cable 120 is held by a friction force acting between the cable 120 and the elastic insert 240, 240'.

As a result of the cable holder 200 described above, the cable weight of the cable 120 in a wind turbine tower 102 can be absorbed in particular at few locations within the tower 102. This results in a high cable weight to be absorbed by each cable holder 200. The cable holder 200 by squeezing the elastic insert 240, 240' between the cable 120 and the cable receptacle 120 enables the cable to be fastened without damage. In particular the external shell of the cable 120 is less stressed in comparison to known solutions. Moreover, the fastening of the cable can be carried out without tools, and the assembly of the cable within the tower 102 is simplified. Moreover, the servicing of the cable fastenings is associated with less complexity.

LIST OF REFERENCE SIGNS

100 Wind turbine
102 Tower
104 Nacelle
106 Rotor
108 Rotor blade
110 Spinner
120 Cable
200 Cable holder
210 Holding element
220 Cable receptacle
221 Funnel-shaped cavity
222 Upper end
224 Upper portion
226 Lower end
228 Lower portion
230 Introduction opening
232 Funnel closure
240, 240' Elastic insert
242 First through opening
244 Second through opening
246 Third through opening
250 First passage
252 Second passage
254 Third passage
V Vertical direction
R Radial direction
U Circumferential direction

The invention claimed is:

1. A cable holder for a cable of a wind turbine, comprising:
 a cable receptacle having a funnel-shaped cavity;
 an elastic insert disposed within the funnel-shaped cavity;
 wherein the cable receptacle and the elastic insert are disposed and configured in such a manner that the cable is configured to extend through the funnel-shaped cavity, and the elastic insert is configured to be held between the cable receptacle and the cable; and
 a holding element for disposal on a tower, the cable receptacle being coupled to the holding element;
 wherein the holding element has an introduction groove having an introduction width that is transverse to an introduction direction, and
 wherein the cable receptacle has an upper end and a lower end,
 wherein the introduction width is smaller than a diameter of the cable receptacle at the upper end such that a form-fitting connection in a vertical direction is configured between the holding element and the cable receptacle.

2. The cable holder as claimed in claim 1, wherein the cable receptacle has an introduction opening at a circumference, and wherein the introduction opening is configured to receive a portion of the cable into the funnel-shaped cavity.

3. The cable holder as claimed in claim 1, wherein:
 the cable receptacle has an upper portion and a lower portion, an upper dimension of the funnel-shaped cavity in the upper portion being larger than a lower dimension of the funnel-shaped cavity in the lower portion; and
 the funnel-shaped cavity in the upper portion or in the lower portion or in both the upper and lower portions have an annular cross section.

4. The cable holder as claimed in claim 3, wherein:
 the upper portion is adjacent to the upper end, and wherein the lower portion is adjacent to the lower end; and
 the cable receptacle has an introduction opening extending from the upper end to the lower end and is configured so that the cable is able to be introduced into the funnel-shaped cavity through the introduction opening.

5. The cable holder as claimed in claim 4, comprising:
a funnel closure for closing the introduction opening;
wherein a shape of the funnel closure corresponds to a shape of the introduction opening.

6. The cable holder as claimed in claim 5, wherein:
the cable receptacle is a first shell segment having a first circumferential extent that is less than 360° in the circumferential direction and forms the introduction opening; and
the funnel closure is a second shell segment having a second circumferential extent, the first circumferential extent and the second circumferential extent together being configured to surround the cable.

7. The cable holder as claimed in claim 1, wherein:
the cable receptacle and/or the elastic insert each have an annular cross section; and
an external circumferential face of the elastic insert is disposed on an internal circumferential face of the cable receptacle.

8. The cable holder as claimed in claim 1, wherein:
the elastic insert is tubular or funnel-shaped; and/or
the elastic insert is a rubber insert; and/or
the cable holder is configured to hold a cable connected to a voltage transformer of the wind turbine.

9. The cable holder as claimed in claim 1, wherein:
the elastic insert has a slot; and
the cable holder has a cable passage axis, a direction of main extent of the slot being aligned so as to be substantially parallel to the cable passage axis.

10. The cable holder as claimed in claim 1, wherein the cable receptacle is rotatably disposed on the holding element.

11. A cable harness for a wind turbine, comprising:
a cable having a cable diameter;
the cable holder as claimed in claim 1;
wherein the cable extends through the cable holder;
wherein the cable receptacle in a longitudinal direction extends from the upper end to the lower end; and
wherein a lower diameter of the cable receptacle relative to the cable diameter is sized in such a manner that the elastic insert is jammed between the cable receptacle and the cable such that a movement of the cable, directed from the upper end toward the lower end of the cable receptacle, is substantially prevented.

12. The cable harness as claimed in claim 11, wherein a first coefficient of friction between the cable receptacle and the elastic insert is lower than a second coefficient of friction between the elastic insert and the cable.

13. The cable harness as claimed in claim 11, wherein the cable has a cable weight of more than 6 kg/m.

14. A tower of a wind turbine, comprising the cable harness as claimed in claim 11.

15. A wind turbine, comprising:
the tower as claimed in claim 14; and
a nacelle on the tower.

16. A tower of a wind turbine, comprising:
two or more cable holders as claimed in claim 1; and
wherein the two or more cable holders are spaced apart from each other by more than 20 meters.

17. A method for fastening a cable in a tower of a wind turbine, the method comprising:
introducing the cable into a cable receptacle having a funnel-shaped cavity; and
disposing an elastic insert in an intermediate space between the cable receptacle and the cable such that the elastic insert at least in portions bears on the cable and the cable receptacle,
wherein the cable receptacle has an upper end and a lower end,
a holding element for disposal on the tower, wherein the cable receptacle is coupled to the holding element,
wherein the holding element has an introduction groove having an introduction width that is transverse to an introduction direction, and
wherein the introduction width is smaller than a diameter of the cable receptacle at the upper end such that a form-fitting connection in a vertical direction is configured between the holding element and the cable receptacle.

18. The method as claimed in claim 17, the method comprising:
closing an introduction opening of the cable receptacle with a funnel closure; and/or
rotating the cable receptacle in such a manner that the introduction opening faces a tower wall; and/or
de-stressing the cable in a vertical direction such that at least part of a weight of the cable is held by a friction force acting between the cable and the elastic insert.

* * * * *